United States Patent
Tanaka et al.

(10) Patent No.: US 9,043,099 B2
(45) Date of Patent: May 26, 2015

(54) DRIVE CONTROL DEVICE FOR WORK VEHICLE

(75) Inventors: Tetsuji Tanaka, Tsuchiura (JP); Koji Hyodo, Tsuchiura (JP); Isamu Aoki, Tsuchiura (JP); Keigo Kikuchi, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/002,074

(22) PCT Filed: Mar. 15, 2012

(86) PCT No.: PCT/JP2012/056723
§ 371 (c)(1),
(2), (4) Date: Aug. 28, 2013

(87) PCT Pub. No.: WO2012/128181
PCT Pub. Date: Sep. 27, 2012

(65) Prior Publication Data
US 2014/0005900 A1    Jan. 2, 2014

(30) Foreign Application Priority Data

Mar. 18, 2011  (JP) ................................. 2011-061175

(51) Int. Cl.
| | | |
|---|---|---|
| *G06F 7/70* | (2006.01) | |
| *E02F 9/20* | (2006.01) | |
| *F02D 29/00* | (2006.01) | |
| *F02D 29/04* | (2006.01) | |
| *B60W 30/188* | (2012.01) | |
| *B60W 30/18* | (2012.01) | |

(52) U.S. Cl.
CPC .............. *E02F 9/2066* (2013.01); *F02D 29/00* (2013.01); *F02D 29/04* (2013.01); *B60W 30/18036* (2013.01); *B60W 30/1884* (2013.01); *B60W 2520/06* (2013.01); *B60W 2520/10* (2013.01);
(Continued)

(58) Field of Classification Search
CPC ..... B60W 10/06; B60W 10/08; B60W 10/00; E02F 9/2066
USPC ............... 701/22, 50, 51; 180/65.265; 477/34
See application file for complete search history.

(56) References Cited

U.S. PATENT DOCUMENTS

| | | | |
|---|---|---|---|
| 6,373,206 B1 * | 4/2002 | Morimoto et al. ............. | 318/139 |
| 6,502,652 B2 * | 1/2003 | Rogg .......................... | 180/65.21 |

(Continued)

FOREIGN PATENT DOCUMENTS

| | | |
|---|---|---|
| JP | 2008-223695 A | 9/2008 |
| JP | 2009-196393 A | 9/2009 |

(Continued)

OTHER PUBLICATIONS

International Search Report dated Apr. 24, 2012 w/ partial English translation (four (4) pages).

*Primary Examiner* — Helal A Algahaim
*Assistant Examiner* — Shardul Patel
(74) *Attorney, Agent, or Firm* — Crowell & Moring LLP

(57) ABSTRACT

When a vehicle speed of a wheel loader (1) is determined to be not higher than a reference value (Yes) in step S4 and a forward/reverse command switch (40) is determined to have been switchingly operated (Yes) in step S5, the routine advances to step S6 where an increment ΔN of engine speed according to an engine load factor is determined. In step S7, the increment ΔN of engine speed is then added to a target engine speed Na corresponding to a depression stroke of an accelerator pedal (38), the thus-determined Na=Na+ΔN is set as a new target engine speed Na, and a target engine speed command i1 is sent to an engine controller (37).

2 Claims, 9 Drawing Sheets

(52) U.S. Cl.
CPC .... *B60W 2540/10* (2013.01); *B60W 2710/0644* (2013.01); *B60Y 2200/41* (2013.01); *B60W 30/1886* (2013.01); *B60W 2550/142* (2013.01)

(56) References Cited

U.S. PATENT DOCUMENTS 8,126,621 B2* 2/2012 Ishii et al. ........................ 701/50
2009/0029826 A1* 1/2009 Eguchi et al. .................... 477/39
2009/0127928 A1* 5/2009 Udagawa et al. ........... 303/113.2
2010/0070146 A1* 3/2010 Ishii et al. ........................ 701/50

FOREIGN PATENT DOCUMENTS

| JP | 2009-197805 A | 9/2009 |
| JP | 2010-180850 A | 8/2010 |

* cited by examiner

ACCELERATOR PEDAL DEPRESSION STROKE

TORQUE CONVERTER SPEED RATIO, e

ENGINE LOAD FACTOR

FLOW CHART OF IDLE-UP CONTROL
ACCORDING TO ENGINE LOAD

FLOW CHART OF IDLE-UP CONTROL
ACCORDING TO ENGINE LOAD

US 9,043,099 B2

DRIVE CONTROL DEVICE FOR WORK VEHICLE

TECHNICAL FIELD

This invention relates to a drive control system for a working vehicle, and specifically to a stall prevention means suitable for a working vehicle with an engine mounted thereon and restricted in fuel injection volume in compliance with emission control.

BACKGROUND ART

Working vehicles such as wheel loaders are also subjected to emission control, and working vehicles with engines mounted thereon and restricted in fuel injection volume to meet emission control are conventionally known. Emission control compliant engines lack so-called tenacity, and are liable to stall when subjected to a large load. Especially in a working vehicle of the torque converter drive system like a wheel loader of the torque converter drive system that an output torque from an engine is transmitted to a transmission via a torque converter to generate traveling drive force, the engine is liable to stall because for its work characteristics, a high load tends to act on the engine even in a state that an accelerator is not depressed.

When the accelerator pedal is released while performing hill-climbing travel, for example, under forward travel selected by a forward/reverse command means, the traveling drive force decreases so that the working vehicle may roll down by its own weight. As a manner of operation of such a wheel loader, it is often practiced to operate the forward/reverse command means during forward travel for the selection of reverse travel or to operate the forward/reverse command means during reverse travel for the selection of forward travel, and then to control the depression stroke of the accelerator pedal for the adjustment of the braking force without operation of a brake pedal. In such a situation, a load by its own weight or an inertia force acts on the engine via tires, the transmission and the torque converter so that upon release of the accelerator pedal, the output torque of the engine becomes lower than the load acting on the engine, leading to engine stall in a worst-case scenario.

In the working vehicle of the torque converter drive system, a steering mechanism and front working equipment, such as a bucket, are driven by the energy of pressure oil delivered from a hydraulic pump driven by the engine. Operation of the steering mechanism and drive of the front working equipment, therefore, apply loads on the engine. When high hydraulic load work that "lifts the bucket while performing steering control" is performed with the target revolution speed for the engine having been set at a low idle speed, for example, the engine becomes more liable to stall. Such a problem becomes particularly pronounced in a working vehicle with an emission control compliant engine mounted thereon and restricted in fuel injection volume.

As a stall prevention technology for a vehicle-mounted engine, a technology has been proposed to determine whether a working vehicle is in a rolling down state or in a non-rolling down state and, when the working vehicle is in the rolling down state, to automatically increase the engine speed than that when the engine is in the non-rolling downstate (see, for example, Patent Document 1). Another technology has also been proposed to detect a speed of an engine and, when the speed of the engine is determined to have dropped to a predetermined threshold level or further, to automatically reduce a torque to be absorbed by a variable displacement hydraulic pump driven by the engine (see, for example, Patent Document 2).

PRIOR ART DOCUMENTS

Patent Documents

Patent Document 1: JP-A-2010-180850
Patent Document 2: JP-A-2009-197805

DISCLOSURE OF THE INVENTION

Problem to be Solved by the Invention

However, the motor control system described in Patent Document 1 for the working vehicle is of the configuration that, when the working vehicle is determined in a rolling down state, a target engine revolution speed is increased to prevent engine stall. It is, therefore, difficult to prevent engine stall when the engine load has suddenly increased as in the case that during traveling, a forward/reverse command means is operated to switch from forward travel to reverse travel or from reverse travel to forward travel. Further, the motor control system for the working vehicle as described in Patent Document 1 is configured to prevent engine stall by equally increasing a target engine speed irrespective of the magnitude of a load actually acting on the engine. It is, therefore, impossible to prevent engine stall when an engine load is excessively large compared with an engine torque corresponding to a target engine speed including an increment added thereto. In view of all conditions of a load acting on a vehicle-mounted engine, the increment of target engine speed may be set higher to avoid engine stall in any cases. However, such setting leads to an increase in wasteful fuel consumption, and therefore, is contrary to the purpose of emission control.

On the other hand, the engine load control system for the working vehicle as described in Patent Document 2 is configured to prevent engine stall by reducing the torque to be absorbed by the variable displacement hydraulic pump when the speed of the engine drops to the threshold level or further under a hydraulic load acting on the working vehicle. It is, therefore, difficult to prevent engine stall when forward/reverse switching is performed during traveling concurrently with an increase in hydraulic load.

With the foregoing problems of the conventional technologies in view, the present invention has as an object thereof the provision of a drive control system for a working vehicle, which can prevent engine stall with certainty even when a large load suddenly acts on a vehicle-mounted engine and which is also excellent in environment friendly performance.

Means for Solving the Problem

To solve the above-described problems, the present invention provides a drive control system for a working vehicle, said drive control system being provided with a controller for performing drive control of the working vehicle, an engine load factor detection means for outputting an engine load factor signal to the controller, a forward/reverse command means for outputting, to the controller, a forward/reverse switching signal for the working vehicle, an accelerator depression stroke detection means for outputting, to the controller, an accelerator pedal signal corresponding to a depression stroke of an accelerator pedal, and a vehicle speed detection means for outputting, to the controller, a vehicle speed signal of the working vehicle, wherein the controller performs a determination as to whether or not the forward/reverse switching signal from the forward/reverse command means has been received, and a determination as to whether or not the vehicle speed of the working vehicle as detected by the vehicle speed detection means is not higher than a threshold level which has been stored beforehand, and, when the forward/reverse switching signal is determined to have been received and the vehicle speed of the working vehicle is determined to be not higher than the threshold level which has been stored beforehand, the controller sends a target engine speed command, which has been obtained by adding an engine stall-preventing increment of target engine speed to a target engine speed set according to the accelerator pedal signal, to the engine.

When forward/reverse switching operation is performed during traveling as mentioned above, the engine load increases suddenly. The engine, therefore, becomes liable to stall when the speed of the working vehicle is low and a target engine speed sent to the engine is low. Under such engine load situations, a target engine speed command, which has been obtained by adding an engine stall-preventing increment of target engine speed to a target engine speed set according to an accelerator pedal signal, is hence outputted to the engine. This can make the engine torque higher than the engine load torque so that engine stall can be prevented with certainty even with respect to an emission control compliant engine.

In the drive control system of the above-described configuration, the controller may preferably set the engine stall-preventing increment of target engine speed according to an engine load factor inputted from the engine load factor detection means.

According to such a configuration as described above, the target engine speed is not equally increased irrespective of the magnitude of a load actually acting on the engine, but the increment of target engine speed is set according to the engine load factor inputted from the engine load factor detection means. Accordingly, the engine load does not become excessive than the engine torque corresponding to the target engine speed including the added increment, and therefore, engine stall can be prevented with certainty. In addition, wasteful fuel consumption can be reduced, because it is unnecessary to set the increment of target engine speed higher to avoid engine stall in any cases in view of all load conditions under which the vehicle-mounted engine may operate.

In the drive control system of the above-described configuration, it may be preferred that the controller sets first and second preset values with respect to an engine load factor inputted from the engine load factor detection means, and sets the increment of target engine speed at a constant value when the engine load factor inputted from the engine load factor detection means is smaller than the first preset value but sets the increment of target engine speed greater as the engine load factor becomes greater when the engine load factor inputted from the engine load factor detection means is not smaller than the first preset value but not greater than the second preset value.

According to an experiment or simulation, engine stall can be prevented without strict control of the increment of target engine speed when engine load is relatively low. When engine load is relatively high in contrast, engine stall tends to occur unless the increment of target engine speed is set greater as the engine load factor becomes greater. It is, therefore, possible to prevent engine stall with certainty and also to achieve a greater reduction of fuel consumption by setting the first and second preset values with respect to the engine load factor and setting the increment of target engine speed at the constant value when the engine load factor is lower than the first preset value but sets the increment of target engine speed greater as the engine load factor becomes greater when the engine load factor is not smaller than the first preset value but not greater than the second preset value.

To solve the above-described problems, the present invention also provides a drive control system for a working vehicle, said drive control system being provided with a controller for performing drive control of the working vehicle, an engine speed factor detection means for outputting, to the controller, an actual revolution speed signal corresponding to an actual revolution speed of the engine, a forward/reverse command means for outputting, to the controller, a forward/reverse switching signal for the working vehicle, an accelerator depression stroke detection means for outputting, to the controller, an accelerator pedal signal corresponding to a depression stroke of an accelerator pedal, a variable displacement hydraulic pump drivable by the engine, and an absorption torque changing means for controlling a torque to be absorbed by the variable displacement hydraulic pump according to an absorption torque command outputted from the controller, wherein the controller performs a determination as to whether or not the forward/reverse switching signal from the forward/reverse command means has been received, a determination as to whether or nor the accelerator pedal signal is a signal during non-operation of the accelerator pedal, and a determination as to whether or not the actual revolution speed of the engine is not higher than a threshold level which has been stored beforehand, and, when the forward/reverse switching command is determined to have been received, the accelerator pedal signal is determined to be the signal during the non-operation of the accelerator pedal and the actual revolution speed of the engine is determined to be not higher than the threshold level which has been stored beforehand, the controller sends, to the absorption torque control means, an absorption torque command which minimizes the torque to be absorbed by the variable displacement hydraulic pump.

According to such a configuration as described above, when the engine load suddenly increase when the forward/reverse command means is switched during traveling, the accelerator pedal is in a non-operated state, and the actual revolution speed of the engine is low, the torque to be absorbed by the variable displacement hydraulic pump is minimized, and therefore, the engine load torque including a hydraulic load can be reduced. Engine stall can hence be prevented with certainty even with respect to an emission control compliant engine.

Advantageous Effects of the Invention

The present invention sends to an engine a target engine speed command, which has been obtained by adding an engine stall-preventing increment of target engine speed to a target engine speed set corresponding to a depression stroke of an accelerator pedal, when a forward/reverse command from a forward/reverse command means is determined to have been received and the speed of a working vehicle is determined to be not higher than a threshold value which has been stored beforehand. It is, therefore, possible to always maintain the engine torque greater than engine load torque and also to prevent engine stall with certainty even with respect to an emission control compliant engine restricted in fuel injection volume.

The present invention also outputs to an absorption torque control means an absorption torque command, which minimizes a torque to be absorbed by a variable displacement hydraulic pump, when a forward/reverse switching command from a forward/reverse command means is determined to have been received, an accelerator pedal signal is determined to be a signal during non-operation of an accelerator pedal and the actual revolution speed of an engine is determined to be not higher than a threshold level which has been stored beforehand. It is, therefore, possible to reduce an engine load torque and to prevent engine stall with certainty even with respect to an emission control compliant engine restricted in fuel injection volume.

MODES FOR CARRYING OUT THE INVENTION

Taking, as an example, a drive control system for a wheel loader, a drive control system according to an embodiment for a working vehicle will hereinafter be described with reference to the drawings.

Figure 1:
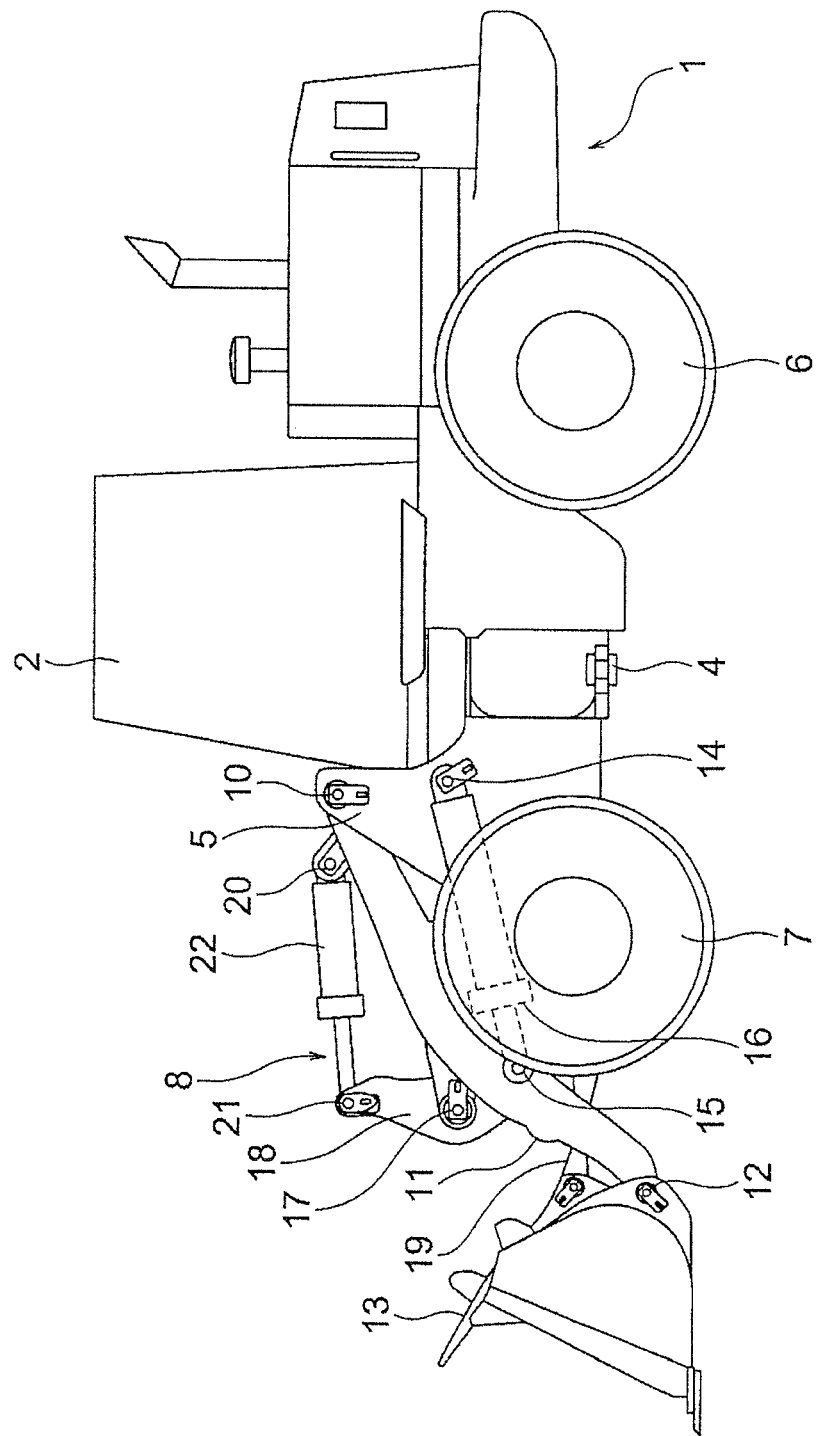
FIG. 1 is an external construction view of a working vehicle according to an embodiment.

As depicted in FIG. 1, the wheel loader 1 to which the drive control system of this embodiment is applied is constructed primarily of a rear body 3 provided with an operator's cab 2, a front body 5 joined to a front side (a forward side of the wheel loader 1) of the rear body 3 via a joint pin 4, wheels 6,7 arranged on these rear body 3 and front body 5, and front working equipment 8 attached to a front part of the front body 5. The front body 5 is constructed to be laterally articulatable about the joint pin 4 as a center relative to the rear body 3. The wheel loader 1 is, therefore, allowed to change its forward direction by manipulating an unillustrated steering device arranged in the operator's cab 2 and articulating the front body 5 in a left direction or right direction relative to the rear body 3.

The front working equipment 8 is constructed of an arm 11 connected at an end thereof to the front body 5 via a pivot pin 10, a bucket 13 attached to a free end portion of the arm 11 via a pivot pin 12, a lift cylinder 16 connected at opposite ends thereof to the front body 5 and arm 11 via pivot pins 14,15, a bell crank 18 pivotally connected to the arm 11 via a pivot pin 17, a link member 19 connected at an end thereof to the bell crank 18 and at an opposite end thereof to the bucket 13, and a bucket tilt cylinder 22 connected at opposite end portions thereof to the front body 5 and bell crank 18 via pivot pins 20,21. It is to be noted that the arm 11, pivot pins 12,14,15 and lift cylinder 16 are arranged only singly in this embodiment but these members are arranged in pairs on left and right sides of the bucket 13 in a real wheel loader.

Figure 2:
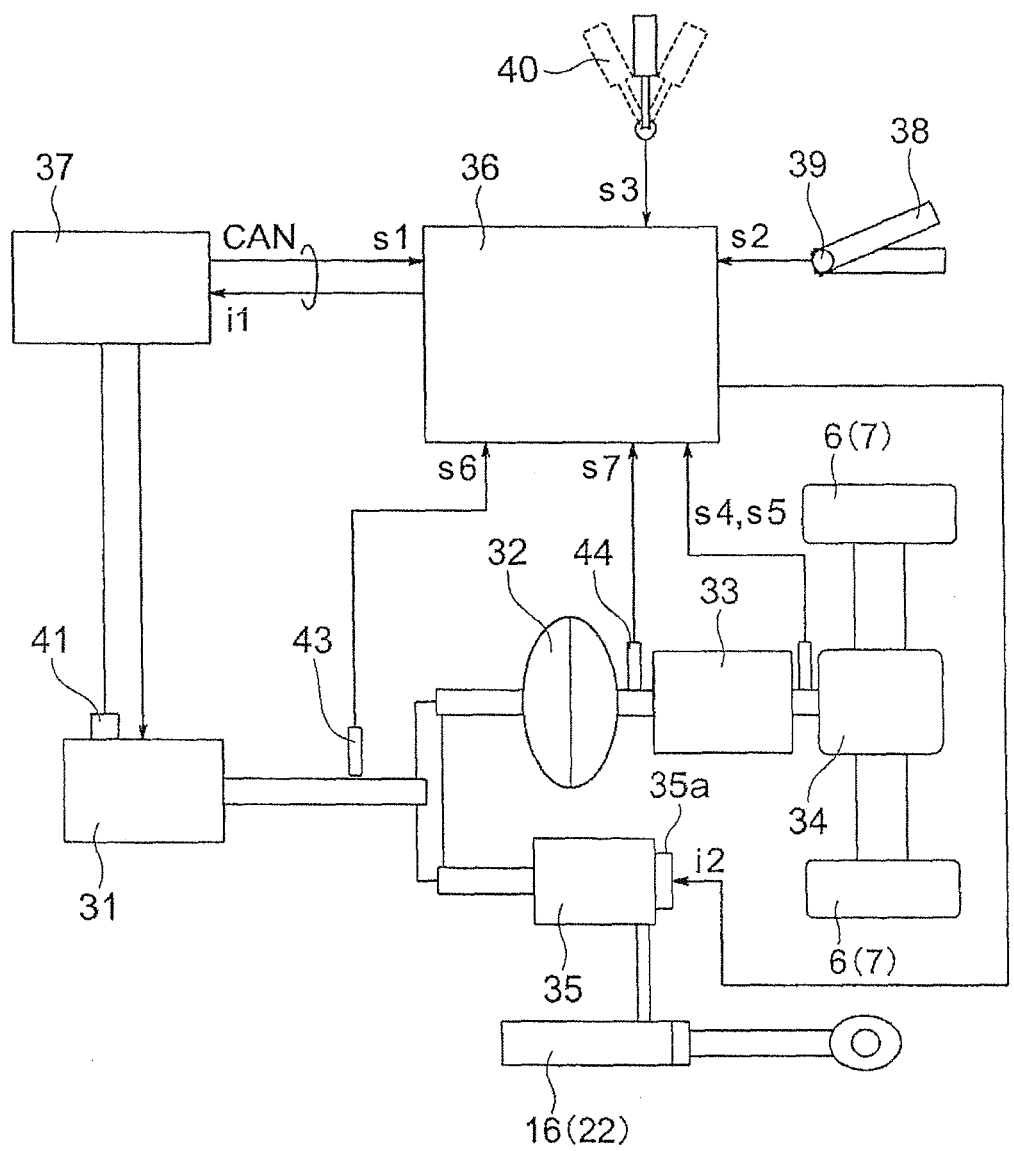
FIG. 2 is a control block diagram for the working vehicle according to the embodiment.

The lift cylinder 16 and bucket tilt cylinder 22 are driven by hydraulic oil delivered from a variable displacement hydraulic pump 35 (see FIG. 2). When the lift cylinder 16 is extended, the arm 11 and bucket 13 ascend. When the lift cylinder 16 is retracted, on the other hand, the arm 11 and bucket 13 descend. The extension and retraction of the lift cylinder 16, in other words, the ascend and descend of the arm 11 and bucket 13 can be performed by manipulating a control device such as a control lever or the like arranged in the operator's cab 2. Further, when the bucket tilt cylinder 22 is extended, the bucket 13 pivots upwardly. When the bucket tilt cylinder 22 is contracted, on the other hand, the bucket 13 pivots downwardly. The extension and retraction of the bucket tilt cylinder 22, in other words, the upward pivot and downward pivot of the bucket 13 can be performed by manipulating the control equipment such as the control lever arranged in the operator's cab 2.

Mounted on the rear body 3 are, as depicted in FIG. 2, an engine 31, a torque converter 32, transmission 33 and axle assembly 34 for transmitting drive force of the engine 31 to the rear wheels 6 and front wheels 7, the variable displacement hydraulic pump 35 drivable by the engine 31, an absorption torque changing means 35a for changing a torque to be absorbed by the variable displacement hydraulic pump 35, and the lift cylinder 16 and bucket tilt cylinder 22 (see FIG. 1) drivable by hydraulic oil delivered from the variable displacement hydraulic pump 35. Arranged in the operator's cab 2 on the rear body 3 are a main controller 36 for performing entire drive control of the wheel loader 1 including the engine 31 and variable displacement hydraulic pump 35, an engine controller 37 for performing drive control of the engine 31 based on control signals outputted from the main controller 36, an accelerator pedal 38, an accelerator depression stroke detection means 39 for outputting a signal corresponding to a depression stroke of the accelerator pedal 38, and a forward/reverse command means 40 for commanding forward/rearward switching of the wheel loader 1.

To the main controller 36, an engine load factor signal s1 outputted from a rack sensor (engine load factor detection means) 41 arranged in a fuel injector for the engine 31 is inputted. Also inputted to the main controller 36 are an accelerator depression stroke signal s2 outputted from the accelerator depression stroke detection means 39 a forward/reverse switching signal s3 outputted from the forward/reverse command means 40, a vehicle speed signal s4 and vehicle traveling direction signal s5 outputted from a vehicle speed sensor (vehicle speed detection means) 42, an actual revolution speed signal s6 of the engine 31 as outputted from an engine speed sensor (engine speed detection means) 43, and a revolution speed signal s7 on an output shaft of the torque converter as outputted from a torque converter turbine speed sensor (torque converter turbine speed detection means) 44. It is to be noted that the vehicle traveling direction signal s5 is also detectable by the torque converter turbine speed sensor 44.

The main controller 36 is comprised including an arithmetic processing unit which has CPU, ROM, RAM and other peripheral circuits, outputs to the engine controller 37 a target engine speed command i1 corresponding to a depression stroke of the accelerator pedal 38 and load conditions of the engine 31, and controls via the engine controller 37 such that the revolution speed of the engine 31 is changed to a target engine speed. Further, the main controller 36 outputs an absorption torque change command i2 to the absorption torque changing means 35a, which changes the torque to be absorbed by the variable displacement hydraulic pump 35 to a predetermined value corresponding to the load conditions of the engine 31. Details of these individual controls will be successively described below.

Figure 3:
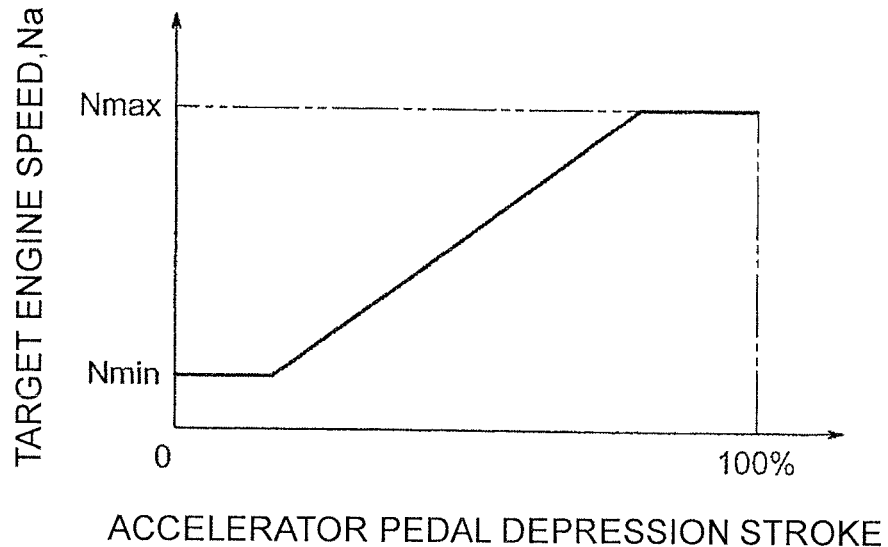
FIG. 3 is a diagram illustrating a relationship between accelerator pedal depression stroke and target engine speed during normal traveling.

Describing first about the control of the engine speed corresponding to the depression stroke of the accelerator pedal 38 and the load conditions of the engine 31, a target engine speed Na is set corresponding to the depression stroke of the accelerator pedal 38 as illustrated in FIG. 3 during normal traveling that no excessive load is acting on the engine 31, a target engine speed Na (low idling speed) during non-operation of the pedal is set at a minimum value Nmin, and the target engine speed Na increases as the depression stroke of the pedal increases. The target engine speed Na upon maximum pedal depression reaches a maximum value Nmax. However, when the wheel loader 1 rolls down by its own weight, when reverse travel is selected by the forward/reverse command means 40 during forward travel, or when forward travel is selected by the forward/reverse command means 40 during reverse travel, an input shaft and the output shaft of the torque converter 32 become opposite to each other in the direction of revolution so that a large load acts on the engine 31 and the engine 31 becomes liable to stall. Especially at the time of switching of the forward/reverse command means 40, a large load suddenly acts on the engine 31 so that the engine 31 becomes more liable to stall.

Described specifically, the torque converter 32 has a function to increase an output torque Tout relative to an input torque Tin, that is, a function to give a torque ratio Tr (=Tout/Tin) of 1 or greater. The torque ratio Tr varies according to a torque converter speed ratio e which is a ratio in revolution speed of the output shaft to the input shaft of the torque converter 32 (output revolution speedNt/input revolution speed Ni). The torque converter speed ratio e takes a positive value when the input shaft and output shaft of the torque converter 32 are the same in the direction of revolution, but takes a negative value when the input shaft and output shaft of the torque converter 32 are different from each other in the direction of revolution.

Figure 4:
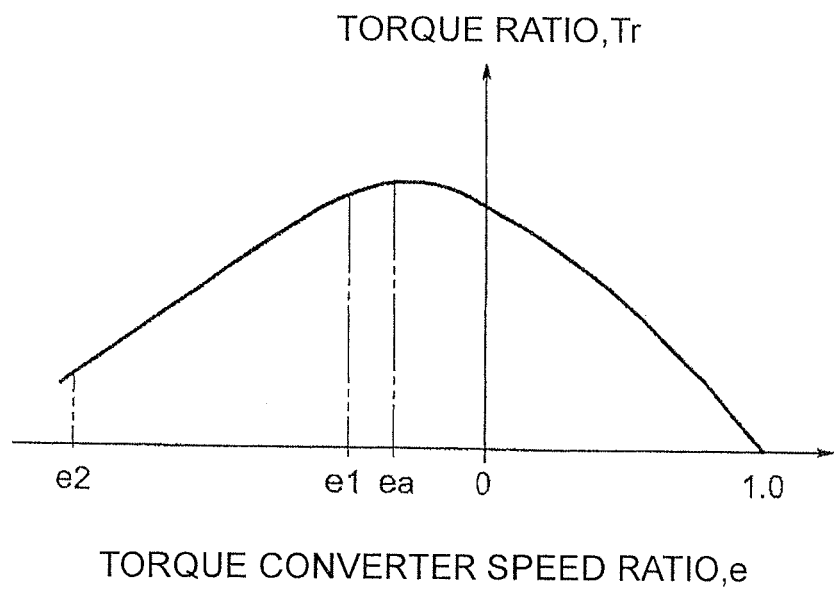
FIG. 4 is a diagram illustrating a relationship between torque converter speed ratio and torque ratio.
Figure 5:
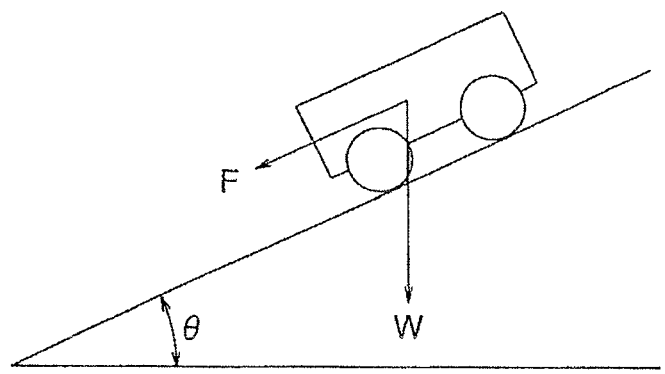
FIG. 5 is an illustration diagram of force acting on a working vehicle during rolling down.

FIG. 4 is a diagram illustrating a relationship between torque converter speed ratio e and torque ratio Tr. In the diagram, in a range where the torque converter speed ratio e is positive, the torque ratio Tr becomes smaller as the speed ratio e increases, and the torque ratio Tr becomes 0 when the speed ratio e is 1. In a range where the torque converter speed ratio e is negative, on the other hand, the torque ratio Tr increases as the speed ratio e decreases in a range of speed ratios e of from 0 to ea, but the torque ratio Tr decreases as the speed ratio e decreases in a range of speed ratios e smaller than ea.

A description will hereinafter be made of an input torque to the torque converter 32 by taking a time of rolling down as an example. In the following calculations, the weight of the vehicle, the inclination of a slope and the force acting on the vehicle to cause it to roll down on the slope of the inclination by its own weight (the force acting on the tires 6 to cause their rolling) will be represented by W, θ and F, respectively. Further, the rolling radius of the tires 6, the rolling resistance of the tires 6, the total gear ratio between the transmission η and the axle assembly 34, and the mechanical efficiency between the tires 6,7 and the transmission 33 will be represented by R, μ, Gi and η, respectively.

At this time, the force F by the own weight and the output torque Tout from the torque converter 32 can be expressed by the following equations, respectively.

$$F = Wx(\sin\theta - \mu \times \cos\theta) \quad (1)$$

$$Tout = F \times R \times \eta / Gi \quad (2)$$

From the above equations (1) and (2), the input torque Tin to the torque converter 32 can be expressed by the following equation (3).

$$Tin = Tout/Tr \quad (3)$$
$$= F \times R \times \eta / (Gi \times Tr)$$
$$= Wx(\sin\theta - \mu \times \cos\theta) \times R \times \eta / (Gi \times Tr)$$

As is evident from the equation (3), the input torque Ti increases as the weight W of the vehicle is greater, the inclination θ is greater, and the torque ratio Tr is smaller. Engine stall occurs when the input torque Tin exceeds an engine output Te (Te<Tin).

Figure 6:
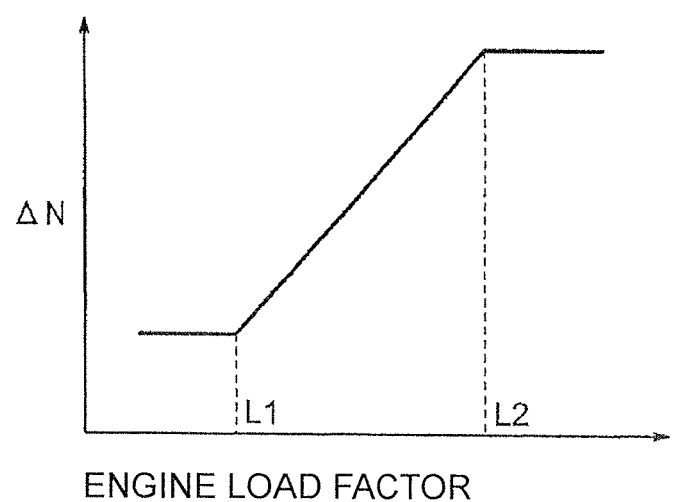
FIG. 6 is a diagram illustrating a relationship between engine load factor and engine speed increment.

In this embodiment, in order to prevent engine stall when the input shaft and output shaft of the torque converter 32 become opposite to each other in the direction of revolution, the main controller 36 adds an increment ΔN of target engine speed (see FIG. 6), which corresponds to an engine load factor signal inputted from the engine controller 37, to a target engine speed Na set corresponding to a depression stroke of the accelerator pedal 38 (see FIG. 3), and outputs the resulting sum to the engine controller 37. In the example of FIG. 6, the increment ΔN of target engine speed is not set at a constant value, but first and second preset values L1, L2 are set with respect to an engine load factor inputted from the engine controller 37, and sets the increment of target engine speed at a constant value when the engine load factor inputted from the engine controller 37 is smaller than the first preset value L1 but sets the increment of target engine speed greater as the engine load factor becomes greater when the engine load factor inputted from the engine controller 37 is not smaller than the first preset value L1 but not greater than the second preset value L2.

Figure 7:
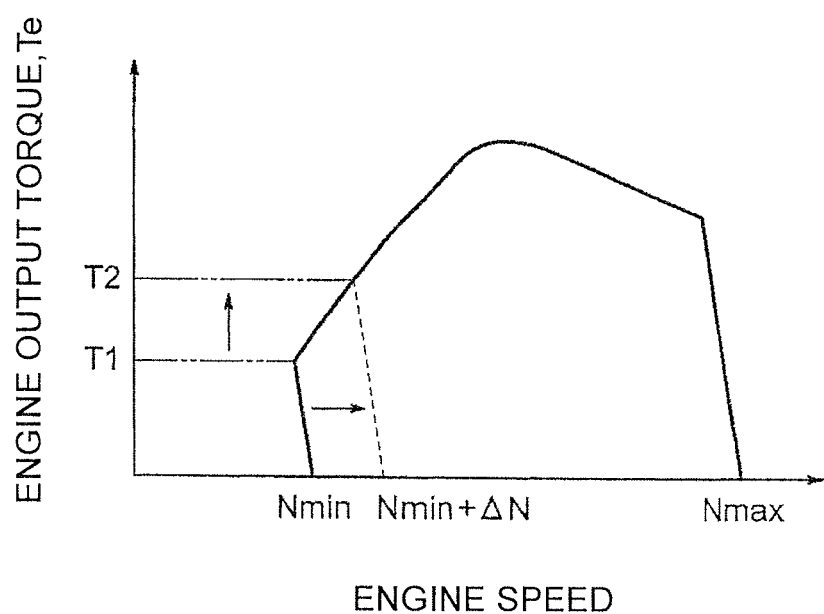
FIG. 7 is a diagram illustrating engine output torque characteristics.

When the revolution speed of the engine 31 is controlled by using, as a target engine speed, the sum of the target engine speed Na corresponding to the depression stroke of the accelerator pedal and the increment ΔN of target engine speed corresponding to the engine load factor signal as described above, the characteristics of the engine output torque Te during normal traveling become as indicated by a solid line in FIG. 7. During rolling down, on the other hand, the target engine speed Na increases by the increment ΔN so that the characteristics of the engine output torque Te shifts rightwards as indicated by a dashed line in the diagram. As a consequence, the engine output torque increases from T1 to T2, and therefore, engine stall can be prevented.

Figure 8:
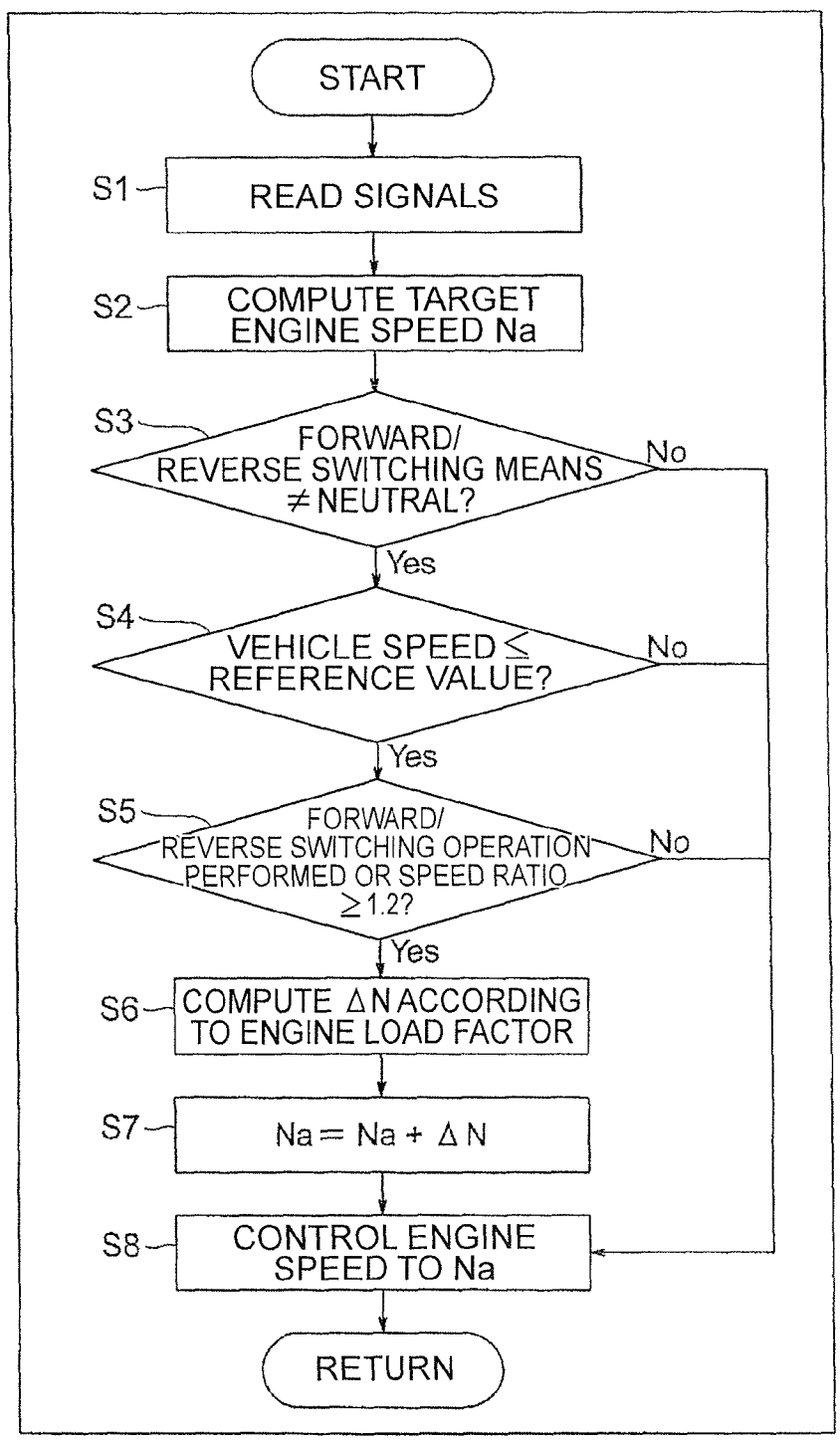
FIG. 8 is a flow chart showing a control procedure for engine speed according to engine load.

Using FIG. 8, a description will hereinafter be made of one example of processing that is performed at CPU of the main controller 36 in this embodiment. The processing shown in the flow chart of FIG. 8 is started, for example, by turning on of an engine key switch. In step S1, signals are read from the various sensors 39, 41-44 and the switch 40, all of which are depicted in FIG. 2. In step S2, a target engine speed Na that corresponds to an accelerator pedal depression stroke detected by the accelerator pedal depression stroke detection means 39 is computed based on the characteristics of FIG. 3 stored beforehand.

In step S3, a determination is made based on the forward/reverse switching signal s3 outputted from the forward/reverse command means 40 as to whether or not the forward/reverse command means 40 is not at a neutral position. When the forward/reverse command means 40 is determined to be not at the neutral position (No) in step S3, the routine advances to step S4, where a determination is made as to whether or not the speed of the wheel loader 1 is equal to or lower than a reference value stored beforehand. When the speed of the wheel loader 1 is determined to be equal to or lower than the reference value (Yes) in step S4, the routine advances to step S5, where based on the forward/reverse signal s3 outputted from the forward/reverse command means 40, a determination is made as to whether or not the forward/reverse command means 40 has been switchingly operated, and based on the actual revolution speed signal s6 of the engine 31 as outputted from the engine speed sensor 43 and the revolution speed signal s7 of the output shaft of the torque converter as outputted from the torque converter turbine speed sensor 44, another determination is made as to whether or not the speed ratio e≥1.2 is satisfied, that is, as to whether or not the wheel loader is in a rolling down state.

When the forward/reverse command means 40 is determined to have been switchingly operated or the wheel loader is in the rolling down state (Yes) in step S5, the routine advances to step S6, where based on the characteristic diagram of FIG. 6, an increment ΔN of target engine speed is determined. The routine then advances to step S7, where the increment ΔN of target engine speed as determined in step S6 is added to the target engine speed Na corresponding to the depression stroke of the accelerator pedal 38 and determined in step S2. Subsequently, the routine advances to step S8, where Na=Na+ΔN determined in step S7 is set as a new target engine speed Na and a target engine speed command i1 is sent to the engine controller 37.

When the forward/reverse command means 40 is determined to be at the neutral position (Yes) in step S3, when the speed of the wheel loader 1 is determined to be not equal to or lower than the reference value (No) in step S4, or when the forward/reverse command means 40 is determine to have been not switchingly operated (No) or the speed ratio e<1.2 is determined (No) in step S5, the routine skips to step S8, where based on the target engine speed Na corresponding to the depression stroke of the accelerator pedal 38 and determined in step S2, drive control of the engine 31 is performed.

As mentioned above, the new target engine speed Na is used by adding the increment ΔN, which corresponds to the increase in engine load by forward/reverse switching or the like, to the target engine speed Na corresponding to the depression stroke of the accelerator pedal 38. Therefore, the drive control system according to the present invention for the working vehicle can increase the output torque of the engine 31, and can prevent engine stall even with respect to an emission control compliant engine restricted in fuel injection volume. Further, the first and second preset values L1, L2 are set with respect to the engine load factor inputted from the engine controller 37, and the increment ΔN of target engine speed is set at the constant value when the engine load factor inputted from the engine controller 37 is smaller than the first preset value L1 but the increment ΔN of target engine speed is set greater as the engine load factor becomes greater when the engine load factor inputted from the engine controller 37 is not smaller than the first preset value L1 but not greater than the second preset value L2. Therefore, the drive control system according to the present invention for the working vehicle can prevent engine stall with certainty, and can also reduce wasteful fuel consumption.

A description will next be made about a drive control method for a variable displacement hydraulic pump upon a sudden increase of engine load.

Figure 9:
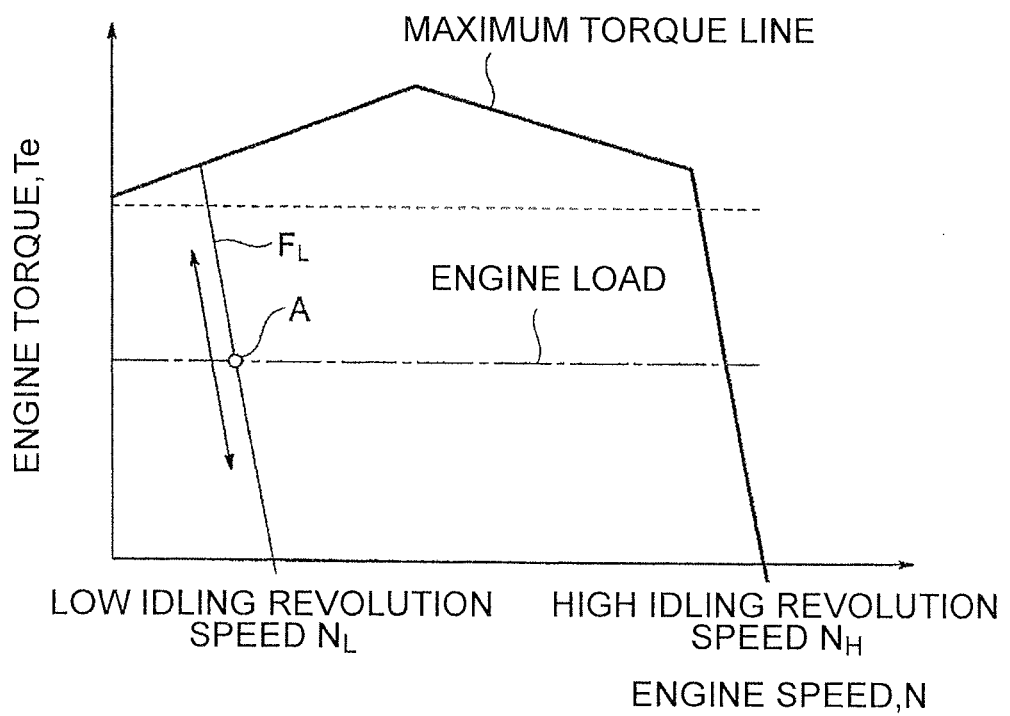
FIG. 9 is a diagram illustrating a relationship among engine speed, engine torque and engine load.

As illustrated in FIG. 9, the engine speed N is controlled such that the engine torque changes in an area defined by a maximum torque line. Described specifically, when the accelerator pedal 38 is in a non-operation state, a low idling revolution speed NL is set as the target engine speed Na. When the engine load varies as a result of driving of the wheels 6,7, driving of the hydraulic cylinders 16, 22, and the like, a matching point A where the output Te of the engine 31 and the engine load are balancing each other moves on and along a regulation line FL.

When the engine load has increased, the main controller 36 makes greater the target engine speed command i1 to be sent to the engine 31 via the engine controller 37 so that the fuel injection volume is increased to raise the engine speed. When the forward/reverse command means 40 is switched during traveling, the engine load increases suddenly as mentioned above. The rise of the engine speed, therefore, cannot follow the increase of the engine load so that the engine becomes liable to stall. In this embodiment, the variable displacement hydraulic pump 35 is hence provided with the absorption torque changing means 35a and, when the engine load has suddenly increased as indicated by a broken line in FIG. 9, a torque to be absorbed by the variable displacement hydraulic pump 35 is forcibly minimized by a command from the main controller 36.

Figure 10:
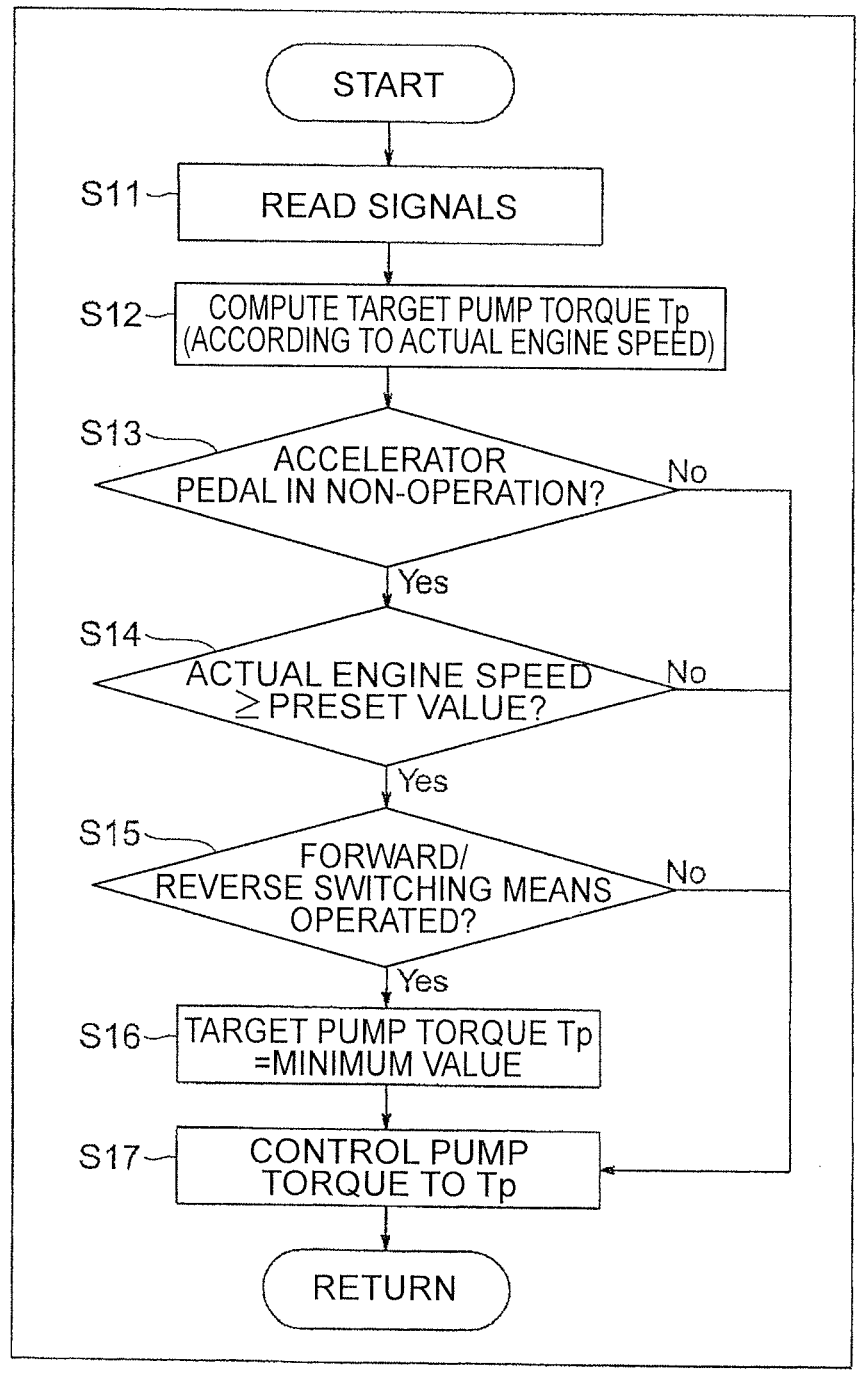
FIG. 10 is a flow chart showing a control procedure for pump torque according to engine load.
Figure 11:
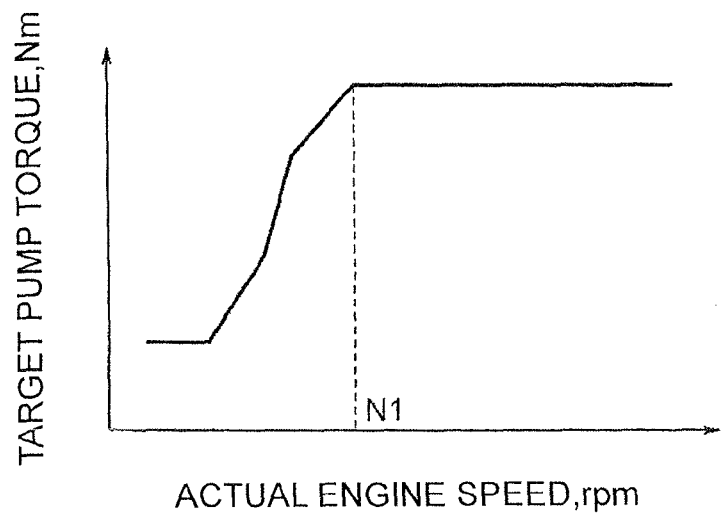
FIG. 11 is a diagram illustrating a relationship between actual engine speed and target pump torque.

Using FIGS. 10 and 11, a description will hereinafter be made of one example of processing that is performed at CPU of the main controller 36 in this embodiment. The processing shown in the flow chart of FIG. 10 is started, for example, by turning on of the engine key switch. In step S11, signals are read from the various sensors 39, 41-44 and the switch 40, all of which are depicted in FIG. 2. In step S12, a target pump torque Pp that corresponds to an actual revolution speed of the engine 31 is determined based on the characteristics of FIG. 11 stored beforehand. In the example of FIG. 11, the variable displacement hydraulic pump 35 has characteristics that the target pump torque Pp becomes the maximum when the actual revolution speed of the engine 31 is not lower than a preset value N1 (for example, 950 rpm or higher) stored beforehand.

In step S13, a determination is made based on the accelerator depression stroke signal s2 outputted from the accelerator depression stroke determination means 39 as to whether or not the accelerator pedal 38 is in a non-operation state. When the accelerator pedal 38 is determined to be in the non-operation state (Yes) in step S13, the routine advances to step S14, where based on an actual revolution speed signal of the engine 31 as outputted from the engine speed sensor 43, a determination is made as to whether or not the actual revolution speed of the engine 31 is equal to or higher than the preset value N1 stored beforehand. When the actual revolution speed of the engine 31 is determined to be equal to or higher than the preset value N1 (Yes) in step S14, the routine advances to step S15, where based on the forward/reverse switching signal s3 outputted from the forward/reverse command means 40, a determination is made as to whether or not the forward/reverse command means 40 has been switchingly operated.

When the forward/reverse command means 40 is determined to have been switchingly operated (Yes) in step S15, the routine advances to step S16, where the target pump torque Tp is set at the minimum value shown in FIG. 11. The routine then advances to step S17, where the minimum value indicating the target pump torque Tp is set as a new target pump torque Tp and the target pump torque Tp is sent to the variable displacement hydraulic pump 35.

When the accelerator pedal 38 is determined to be in an operated state (No) in step S13, when the actual engine speed is lower than the preset value N1 (No) in step S14, or when the forward/reverse command means 40 is determined to have been not switchingly operated (No) in step S15, the routine skips to step S17, where based on the target pump torque Tp determined in step S12, drive control of the variable displacement hydraulic pump 35 is performed.

Figure 12:
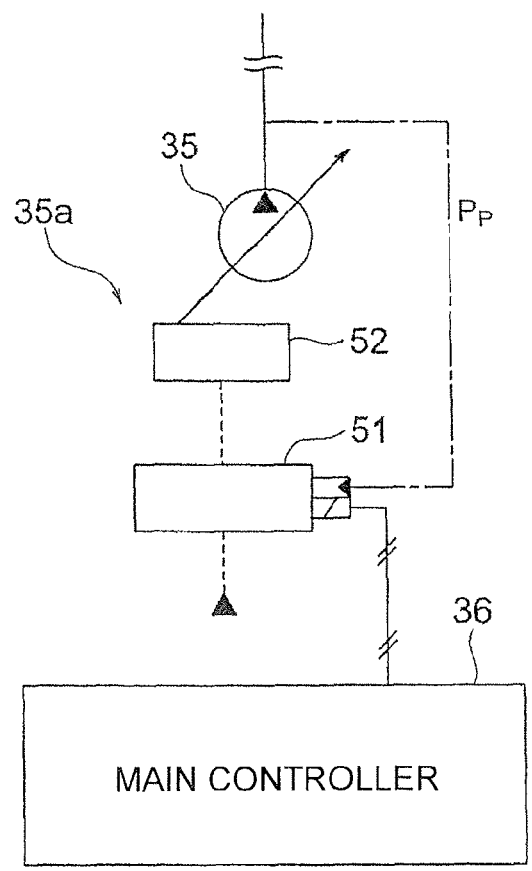
FIG. 12 is a construction diagram of an absorption torque changing means.

In FIG. 12, a specific example of the absorption torque changing means 35a is depicted. As is evident from this diagram, the absorption torque changing means 35a in this embodiment is configured to control the displacement of the variable displacement hydraulic pump 35 by inputting a delivery pressure Pp from the variable displacement hydraulic pump 35 to a pilot port of a PC valve 51 to feed hydraulic oil, which corresponds to the delivery pressure Pp, to a servovalve 52 and changing the swash plate angle of the variable displacement hydraulic pump 35 by the operation of the servovalve 52. The PC valve 51 is comprised of a selectively-operable pressure control valve, and to its solenoid pilot port, the absorption torque change command i2 from the main controller 36 is inputted.

Before the absorption torque change command i2 is outputted from the main controller 36, the PC valve 51 controls the swash plate angle of the variable displacement hydraulic pump 35 such that the multiplication product of a delivery pressure and volume of hydraulic oil from the variable hydraulic pump 35 will not exceed a predetermined torque. When the absorption torque change command i2 is outputted from the main controller 36, on the other hand, the PC valve 51 maximizes the swash plate angle of the variable displacement hydraulic pump 35 and minimizes the torque to be absorbed by the variable displacement hydraulic pump 35. As a result, the torque of the engine 31 can be increased commensurate with the hydraulic load and can be brought into matching at a matching point for a high hydraulic load. It is, therefore, possible to prevent engine stall.

It is to be noted that, although the main controller 36 and engine controller 37 are arranged as controllers for performing drive control of the working vehicle in the above-described embodiment, the drive control of the working equipment can be obviously performed by a single controller comprised in combination of such controllers.

Industrial Applicability

The present invention can be applied to drive control systems for working vehicles such as wheel loaders.

LEGEND

1 Wheel loader
2 Operator's cab
3 Rear body
5 Front body
6,7 Wheels
8 Front working equipment
16 Lift cylinder
22 Bucket tilt cylinder
31 Engine
32 Torque converter
33 Transmission
34 Axle assembly
35 Variable displacement hydraulic pump
35a Absorption torque changing means
36 Main controller
37 Engine controller
38 Accelerator pedal
39 Accelerator pedal depression stroke detection means
40 Forward/reverse command means
41 Rack sensor
42 Vehicle speed sensor
43 Engine speed sensor
44 Torque converter turbine speed sensor
51 PC valve
52 Servovalve

The invention claimed is:

1. A drive control system for a working vehicle, said drive control system comprising: a controller for performing drive control of the working vehicle, an engine load factor detection sensor configured to output an engine load factor signal to the controller, a forward/reverse command switch configured to output, to the controller, a forward/reverse switching signal for the working vehicle, an accelerator depression stroke detection sensor configured to output, to the controller, an accelerator pedal signal corresponding to a depression stroke of an accelerator pedal, and a vehicle speed detection sensor configured to output, to the controller, a vehicle speed signal of the working vehicle, wherein: the controller performs a determination as to whether or not the forward/reverse switching signal from the forward/reverse command switch has been received, and a determination as to whether or not the vehicle speed of the working vehicle as detected by the vehicle speed detection sensor is not higher than a threshold level which has been stored beforehand, when the forward/reverse switching signal is determined to have been received and the vehicle speed of the working vehicle is determined to be not higher than the threshold level which has been stored beforehand, the controller sends a target engine speed command, which has been obtained by adding an engine stall-preventing increment of target engine speed to a target engine speed set according to the accelerator pedal signal, to the engine, wherein the controller sets the engine stall-preventing increment of target engine speed according to an engine load factor inputted from the engine load factor detection sensor, and wherein the controller sets first and second preset values with respect to an engine load factor inputted from the engine load factor detection sensor, and sets the increment of target engine speed at a constant value when the engine load factor inputted from the engine load factor detection sensor is smaller than the first preset value but sets the increment of target engine speed greater as the engine load factor becomes greater when the engine load factor inputted from the engine load factor detection sensor is not smaller than the first preset value but not greater than the second preset value.

2. A drive control system for a working vehicle, said drive control system comprising: a controller for performing drive control of the working vehicle, an engine speed factor detection sensor configured to output, to the controller, an actual revolution speed signal corresponding to an actual revolution speed of the engine, a forward/reverse command switch configured to output, to the controller, a forward/reverse switching signal for the working vehicle, an accelerator depression stroke detection sensor configured to output, to the controller, an accelerator pedal signal corresponding to a depression stroke of an accelerator pedal, a variable displacement hydraulic pump drivable by the engine, and an absorption torque changing device, including a plurality of hydraulic valves, configured to control a torque to be absorbed by the variable displacement hydraulic pump according to an absorption torque command outputted from the controller, wherein: the controller performs a determination as to whether or not the forward/reverse switching signal from the forward/reverse command switch has been received, a determination as to whether or not the accelerator pedal signal is a signal during non-operation of the accelerator pedal, and a determination as to whether or not the actual revolution speed of the engine is not higher than a threshold level which has been stored beforehand, when the forward/reverse switching command is determined to have been received, the accelerator pedal signal is determined to be the signal during the non-operation of the accelerator pedal and the actual revolution speed of the engine is determined to be not higher than the threshold level which has been stored beforehand, the controller sends, to the absorption torque control device, an absorption torque command which minimizes the torque to be absorbed by the variable displacement hydraulic pump, and wherein the controller sets first and second preset values with respect to an engine load factor inputted from an engine load factor detection sensor, and sets an increment of target engine speed at a constant value when the engine load factor inputted from the engine load factor detection sensor is smaller than the first preset value but sets the increment of target engine speed greater as the engine load factor becomes greater when the engine load factor inputted from the engine load factor detection sensor is not smaller than the first preset value but not greater than the second preset value.

* * * * *